Patented Sept. 5, 1939

2,172,109

UNITED STATES PATENT OFFICE 2,172,109

ALKALI SOLUBLE CELLULOSE ETHERS

Frank H. Reichel and Walter F. Hindry, Fredericksburg, Va., assignors to Sylvania Industrial Corporation, Fredericksburg, Va., a corporation of Virginia No Drawing. Application October 15, 1936, Serial No. 105,706

5 Claims. (Cl. 260—231)

The invention relates in general to cellulose derivatives and in particular to a process for producing alkali-soluble cellulose ethers, and the product produced.

Heretofore, in producing an alkyl ether of cellulose which is soluble in 10% sodium hydroxide at 0° C. by treating fibrous cellulose with a suitable etherifying agent, it has been considered necessary to use a large excess of etherifying agent over that theoretically required to produce such a soluble ether. For example, in U. S. Patent No. 1,941,276, issued December 26, 1933, to Schorger, it is stated at page 3, lines 73–79, that "under ordinary conditions of reaction it is necessary to supply about 18% to 20% of ethylene oxide to complete solubility (using a high-grade cellulose) in dilute caustic soda solution, provided the reaction product is not subjected to a temperature below freezing in the presence of the caustic soda solution".

It is known that a ratio of cellulose units ($C_6H_{10}O_5$) to alkyl radicals of about 3.5 to 1 is the highest ratio possible in a cellulose ether having substantially complete solubility in 10% caustic soda without freezing, when the reaction is carried out in the presence of an alkali solution having a concentration of about 25%–30% at a temperature below 45° C. A cellulose hydroxyalkyl ether having an average ratio of cellulose units to alkyl radicals of about 3.5 to 1 contains about 7.75% of the alkyl radical, calculated as the hydroxy-ethyl group. Therefore, when 18% to 20% ethylene oxide is employed, as stated in the above mentioned patent, the oxide is present in a quantity over 100% in excess of that theoretically required to produce an ether having the desired solubility in a 10% caustic soda solution without freezing the solution.

It is known, however, that the excess alkylating agent is substantially completely absorbed by the reaction mixture. It is believed that this excess is used up in one or more of the following ways: (1) Part of the alkylating agent may be absorbed by the cellulose ether, resulting in a degradation of the cellulose; (2) When ethylene oxide or an ethylene halohydrin is used, a part of the alkylating agent may form a limited amount of ethylene glycol or diethylene glycol and is thus rendered inactive for converting cellulose to cellulose ether. (3) Part of the alkylating agent may react with the previously formed cellulose ether producing a complex cellulose ether in which (a) an alkyl radical replaces the hydrogens of additional hydroxyl groups present in the cellulose unit and/or (b) an alkyl radical forms chain compounds with the hydroxyl group of the hydroxy-alkyl radical already present in the cellulose ether.

From the above consideration it is clear that the use of an excess of alkylating agent not only represents a waste of such agent, which is an expensive substance, but that the quality of the cellulose ether produced is impaired and rendered unsuitable for certain commercial applications.

It is a general object of the invention to produce a cellulose alkyl ether which is soluble in 10% sodium hydroxide and insoluble in water, and under conditions of reaction such as to prevent a degradation of the cellulose molecule and to increase the strength of the cellulose ether produced.

It is another object of the present invention to provide a process for making cellulose ethers which are substantially completely soluble in 10% sodium hydroxide at 0° C. and insoluble in water, in such a manner as to decrease the quantities of alkali and of alkylating agent used per unit of cellulose.

It is a further object of the invention to provide a process for increasing the yield of alkali-soluble cellulose ethers when using a given quantity of etherifying agent which is substantially less than that heretofore required.

It is a specific object of the invention to utilize cellulose in such a form and condition as to obtain a substantially theoretical yield of alkali-soluble cellulose ethers.

Other objects of the invention will in part be obvious and will in part appear hereinafter.

We have discovered that a substantially theoretical yield may be obtained in the conversion of cellulose and a suitable alkylating agent to an alkali-soluble alkyl ether of cellulose if the cellulose alkylated comprises a mixture of fibrous cellulose and cellulose hydrate. According to the now preferred embodiment of the invention, an alkali-soluble water-insoluble alkyl ether of cellulose may be prepared by alkylating fibrous cellulose with an etherifying agent in an amount in excess of that theoretically required to convert the fibrous cellulose alone to the desired alkyl ether of cellulose, preferably one containing on the average not substantially more than 3.5 cellulose units to one alkyl radical, and adding to the fibrous cellulose an amount of cellulose hydrate, preferably in the gel state, to convert excess etherifying agent to the desired alkyl ether of cellulose. The reaction is carried out at a relatively low temperature in the presence of an alkali.

The invention accordingly comprises a process having the several steps and the relation of one or more of such steps with respect to each of the others thereof, which will be exemplified in the process hereinafter disclosed, and the scope of the invention will be indicated in the claims.

As pointed out above, the raw cellulose employed in the process of the invention comprises a mixture of two types, namely (1) fibrous cellulose and (2) cellulose hydrate. For the fibrous cellulose there may be employed any suitable natural cellulose, such, for example, as wood pulp, cotton linters, mercerized cellulose fibres, or fibrous alkali cellulose. The fibrous cellulose is preferably an alkali cellulose prepared from a high grade alpha cellulose which has been purified in a suitable manner of impurities which might adversely affect the alkylating reaction, and which has been comminuted but as little chemically degraded as possible. The alkali cellulose may be prepared by steeping the fibrous cellulose a sufficient quantity of a 17% to 20% aqueous solution of a strong alkali, such for example as sodium hydroxide, for a period of 1 to 2 hours.

For the cellulose hydrate there may be employed any suitable non-fibrous cellulosic material included in the term "cellulose hydrate" as defined in Heuser, Textbook of Cellulose Chemistry, 1924, page 18. For example, the cellulose hydrate utilized in the invention may be derived from the regeneration of cellulose from viscose or solutions of cuprammonium cellulose and of cellulose in zinc chloride or from the de-esterification of cellulose esters. The amount of the amorphous cellulose to be admixed with the fibrous cellulose may be varied through a wide range, the upper limit depending upon the quantity of excess alkylating agent present. It is preferable to keep the amount of amorphous cellulose below 50% of the cellulose mixture, calculated as $C_6H_{10}O_5$, since the products formed from the amorphous cellulose have less strength than those formed of an equal weight of fibrous cellulose. This appears to be due to the fact that the cellulose is more degraded in amorphous cellulose than in fibrous cellulose.

It has been found that substantial economy in the process of the invention may be achieved by using the waste cellulose hydrate derived from the manufacture of Cellophane, rayon, tubing or other articles from the above mentioned cellulose solutions. Before reaction the cellulose hydrate is freed of glycerine or other plasticizer and preferably comminuted, as by shredding.

It is preferable to tumefy the amorphous cellulose before it is alkylated, since its activity appears to be greater when in a swollen condition. The amorphous cellulose may be tumefied by admixing it with the fibrous cellulose and shredding the mixture in the presence of alkali having a concentration and an amount sufficient to convert the fibrous cellulose to alkali cellulose. In this case the amount of amorphous cellulose need not be considered in calculating the quantity of alkali required. If desired, the amorphous cellulose may be added to the wet alkali cellulose after comminuting and ageing and before or during alkylation, but in these latter cases the shredding during alkylation is continued for a period sufficient to tumefy the amorphous cellulose. But it is not necessary to convert the amorphous cellulose to alkali cellulose before etherification.

As the alkylating agent there may be employed an alkylene oxide such, for example, as ethylene oxide, propylene oxide, and their reactive homologues; glycides and the like; also a suitable halohydrin such, for example, as chlorhydrin, epichlorhydrin and the like, and mixtures of two or more of these reagents. With the halohydrins there is used an alkali in an amount sufficient to split off a hydrohalogen and form in situ an alkylene oxide which reacts with the cellulose. In the specification and claims the alkylating agent is calculated as ethylene oxide ($C_2H_4O$) and is used preferably in an amount above 7.75% by weight of the dry fibrous cellulose calculated as $C_6H_{10}O_5$, or in a ratio of from one mole of alkylene oxide to each three and one half moles of fibrous cellulose. In calculating the theoretical percentage of alkylating agent to be used the calculation is made on the basis of total dry cellulose, including the amorphous cellulose on the basis $C_6H_{10}O_5$.

For the alkali there may be employed any suitable strong alkali such, for example, as sodium hydroxide or potassium hydroxide. With respect to the quantity of solid alkali employed, it is understood that whether the alkylene oxide is added directly or formed in situ, preferably a trace of alkali is present. In the preferred embodiment, the mole ratio, by weight, of dry cellulose, on the basis $C_6H_{10}O_5$, to solid alkali, calculated as NaOH, present during alkylating does not exceed the ratio of about 1:2. Sufficient water is present during alkylation so that the concentration of the alkali solution is about 20% and preferably about 15%. It has been found that the amount and concentration of alkali play an important role in determining the physical characteristics of the final product.

The alkylation may be carried out at a relatively low temperature and is preferably carried out at an atmospheric temperature of from 15° C. to 20° C. The mixture is constantly stirred during alkylation to prevent the formation of lumps and the reaction usually is complete in about 2 to 3 hours. The reaction product is purified and dried in known manner.

By way of illustrating the process, but not by way of limiting the scope of the invention, there will be given the following examples:

I. One part of shredded fibrous cellulose, such as a purified wood pulp having a high alpha cellulose content, is converted to alkali cellulose by steeping it in a suitable quantity of an 18% sodium hydroxide solution at 20–25° C. for a period of one hour. The alkali is then allowed to drain off and the fibrous alkali cellulose is pressed to a weight approximately three times that of the dry cellulose originally taken. After pressing, the alkali cellulose is shredded for one hour at from 15° to 20° C. While still in the shredder, the alkali cellulose is treated with chlorhydrin in an amount 18.9% (equivalent to 10.33% ethylene oxide) by weight of the cellulose calculated on the basis of dry fibrous cellulose ($C_6H_{10}O_5$). This treatment is carried out with constant stirring at a temperature of from 15° to 20° C. for about one hour. Since the one part of fibrous cellulose requires theoretically only 7.75% of the ethylene oxide for conversion to a cellulose ether containing 3.5 cellulose units for each alkyl radical, there remains about 2.58% ethylene oxide in excess. There is now added to the reaction chamber, without permitting the ethylene oxide to escape, 0.3 part of amorphous cellulose, such as comminuted purified waste cellulose hydrate, in the gel state. The resulting mixture is now stirred at 15° to 20° C. for an additional period of three hours. The cellulose ether thus produced is then washed free of sodium chloride and sodium hydroxide with hot water. The washed material is next acidified, then preferably washed a second time, and dried by centrifuging. The product is a hydroxyethyl ether of cellulose containing an average of about 3.5 cellulose units to each ethyl radical and which is insoluble in water and at least 95% soluble in 10% sodium hydroxide at 0° C. Since the total cellulose converted is 1.3 parts, the yield is substantially theoretical based upon the total quantity of alkylating agent present.

II. A mixture comprising one part of shredded dry purified cotton linters and 0.1 part purified shredded cellulose hydrate is steeped with twelve parts of an 18% aqueous solution of sodium hydroxide at 20° to 25° C. for a period of one hour. The alkali is then drained off and the cellulose mixture is pressed to a weight approximately three times that of the dry cellulose originally taken and then shredded for an hour at from 15° to 18° C. The mixture of cellulose is treated with 10% by weight of ethylene oxide, based on the weight of dry fibrous cellulose ($C_6H_{10}O_5$), at a temperature of from 15° to 20° C. for about three hours or longer with constant stirring. The one part of fibrous cellulose requires theoretically 9.07% of ethylene oxide for conversion to a cellulose ether containing 3.0 cellulose units to one ethyl radical. The cellulose ether is then washed with hot water, acidified, washed a second time and the granular product dried by centrifuging. The hydroxyethyl ether of cellulose thus produced contains on the average about 3 cellulose units to each ethyl radical and it is readily soluble in 10% sodium hydroxide at 0° C. but insoluble in water.

To prepare an alkali-soluble cellulose ether from waste Cellophane which has been coated with a moistureproof coating, the coating and glycerine are removed in any suitable manner, by the process disclosed in U. S. Patent No. 1,997,766. This product may be utilized in the process described in Example I and Example II.

It has been found that the amorphous cellulose in the gel state combines readily with the excess alkylating agent. The alkylating agent, accordingly, is converted to cellulose ether with an almost theoretical yield because the presence of the amorphous cellulose prevents the excess agent from adversely attacking the ether produced from the fibrous cellulose and avoids the waste of the excess agent in side reactions. In other words, taking a suitable alkylating agent in the amount normally employed by the prior art to convert one mole of fibrous cellulose to an alkali-soluble cellulose ether, there remains an excess of alkylating agent which can not be utilized by the fibrous cellulose but which reacts readily with amorphous cellulose to give a substantially theoretical yield of the cellulose ether. The mixed product is soluble in 10% sodium hydroxide without freezing the product in the presence of an alkali.

According to the present invention, substantial economies are achieved (1) in utilizing waste cellulose hydrate, (2) in utilizing smaller quantities of alkali, (3) in using smaller quantities of etherifying agent per unit of cellulose converted than heretofore used in preparing such products, (4) in preventing the fibrous cellulose from being attacked by excess etherifying agent, thereby carrying out the process without degrading the fibrous cellulose, and (5) in producing a cellulose ether which does not require freezing in alkali solution to effect substantial solubility in 10% caustic alkali.

The cellulose ether of the present invention is suitable for the production of films, sheets, filaments, tubing and moulded articles. It may be used in the preparation of fillers, sizes, adhesives, coating and impregnating compositions, in particular compositions for the finishing of natural and artificial materials such as paper, textiles, leather, etc.; also as an intermediate in the preparation of other cellulose derivatives and products.

Since certain changes in carrying out the above process, and certain modifications in the article which embody the invention may be made without departing from its scope, it is intended that all matter contained in the above description shall be interpreted as illustrative and not in a limiting sense.

In the specification and claims the expression "alkali-soluble" defines a cellulose ether which is at least 95% soluble in a 10% aqueous solution of sodium hydroxide at 0° C.; the expression "excess" used with reference to the alkylating agent is a quantity which is greater than that theoretically required to convert fibrous cellulose to an alkali-soluble cellulose ether; and the expression "alkyl" includes alkyl, aralkyl, hydroxy-alkyl and hydroxy-aralkyl groups. It is to be understood that all of the cellulose ether molecules do not necessarily contain 3.5 cellulose units to 1 alkyl radical, that is, some molecules may contain a higher ratio and others a lower ratio, but when the entire mass is averaged the proportion is 3.5 to 1. The expression "on the average" with respect to such ratios is to be interpreted in this manner.

It is also to be understood that the following claims are intended to cover all of the generic and specific features of the invention herein described, and all statements of the scope of the invention which, as a matter of language, might be said to fall therebetween.

We claim:

1. In a process for producing alkali-soluble cellulose ethers, the steps comprising treating a fibrous cellulose with an alkylating agent in an amount in excess of that theoretically required to convert the fibrous cellulose to an alkyl ether of cellulose containing on the average not substantially more than 3.5 cellulose units to one alkyl radical, simultaneously adding to the fibrous material an amount of cellulose hydrate to convert excess alkylating agent to the cellulose ether, and carrying out the reaction at a relatively low temperature in the presence of an alkali and continued until there is produced an alkali soluble cellulose ether.

2. In a process for producing alkali-soluble cellulose ethers, the steps comrising reacting one part of fibrous cellulose calculated as $C_6H_{10}O_5$ with more than 7.75% by weight of an alkylating agent calculated as ethylene oxide to form a cellulose ether containing on the average 3.5 cellulose units to one alkyl radical, and converting excess alkylating agent to said cellulose ether by simultaneously reacting cellulose hydrate therewith, thereby preventing said excess from impairing the cellulose ether formed from the fibrous cellulose, and continuing the reaction under such conditions that there is formed an alkali soluble cellulose ether.

3. In a process for producing alkali-soluble cellulose ethers, the steps comprising shredding a mixture of fibrous cellulose and cellulose hydrate in the presence of an alkali until the fibrous cellulose has been converted to alkali cellulose and the cellulose hydrate has become swollen, and alkylating the mixed cellulose with a suitable alkylating agent in an amount not substantially more than that theoretically required to convert the mixture of cellulose to an alkali-soluble cellulose ether, and continuing the reaction under such conditions that there is formed an alkali soluble cellulose ether.

4. In a process for producing alkali-soluble cellulose ethers, the steps comprising shredding a fibrous cellulose in the presence of an alkali until the fibrous cellulose has been converted to alkali cellulose, alkylating the alkali cellulose with a suitable alkylating agent in an amount in excess of that theoretically required to convert the alkali cellulose to an alkali-soluble cellulose ether and adding cellulose hydrate to the reaction mixture in an amount sufficient to convert excess alkylating agent to the desired cellulose ether, and continuing the reaction under such conditions that there is formed an alkali soluble cellulose ether.

5. As a composition of matter, an alkyl ether of cellulose containing on the average 3.5 cellulose units to one alkyl radical and which is identical with the cellulose ether produced according to the process recited in claim 1.

FRANK H. REICHEL.
WALTER F. HINDRY.

CERTIFICATE OF CORRECTION.

Patent No. 2,172,109. September 5, 1939.

FRANK H. REICHEL, ET AL.

It is hereby certified that error appears in the printed specification of the above numbered patent requiring correction as follows: Page 2, first column, line 36, for "fibrius" read fibrous; line 60, for the word "admiring" read admixing; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.

cellulose ethers, the steps comprising shredding a mixture of fibrous cellulose and cellulose hydrate in the presence of an alkali until the fibrous cellulose has been converted to alkali cellulose and the cellulose hydrate has become swollen, and alkylating the mixed cellulose with a suitable alkylating agent in an amount not substantially more than that theoretically required to convert the mixture of cellulose to an alkali-soluble cellulose ether, and continuing the reaction under such conditions that there is formed an alkali soluble cellulose ether.

4. In a process for producing alkali-soluble cellulose ethers, the steps comprising shredding a fibrous cellulose in the presence of an alkali until the fibrous cellulose has been converted to alkali cellulose, alkylating the alkali cellulose with a suitable alkylating agent in an amount in excess of that theoretically required to convert the alkali cellulose to an alkali-soluble cellulose ether and adding cellulose hydrate to the reaction mixture in an amount sufficient to convert excess alkylating agent to the desired cellulose ether, and continuing the reaction under such conditions that there is formed an alkali soluble cellulose ether.

5. As a composition of matter, an alkyl ether of cellulose containing on the average 3.5 cellulose units to one alkyl radical and which is identical with the cellulose ether produced according to the process recited in claim 1.

FRANK H. REICHEL.
WALTER F. HINDRY.

CERTIFICATE OF CORRECTION.

Patent No. 2,172,109. September 5, 1939.

FRANK H. REICHEL, ET AL.

It is hereby certified that error appears in the printed specification of the above numbered patent requiring correction as follows: Page 2, first column, line 36, for "fibrius" read fibrous; line 60, for the word "admiring" read admixing; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.